June 16, 1942.   M. PRINGLE ET AL   2,286,644
METHOD AND APPARATUS FOR PROCESSING POTATOES
Filed March 5, 1937   2 Sheets-Sheet 1

Inventors
Mark Pringle
Herman F. Lame
by Geo. A. Back
Attorney

June 16, 1942.    M. PRINGLE ET AL    2,286,644
METHOD AND APPARATUS FOR PROCESSING POTATOES
Filed March 5, 1937    2 Sheets-Sheet 2
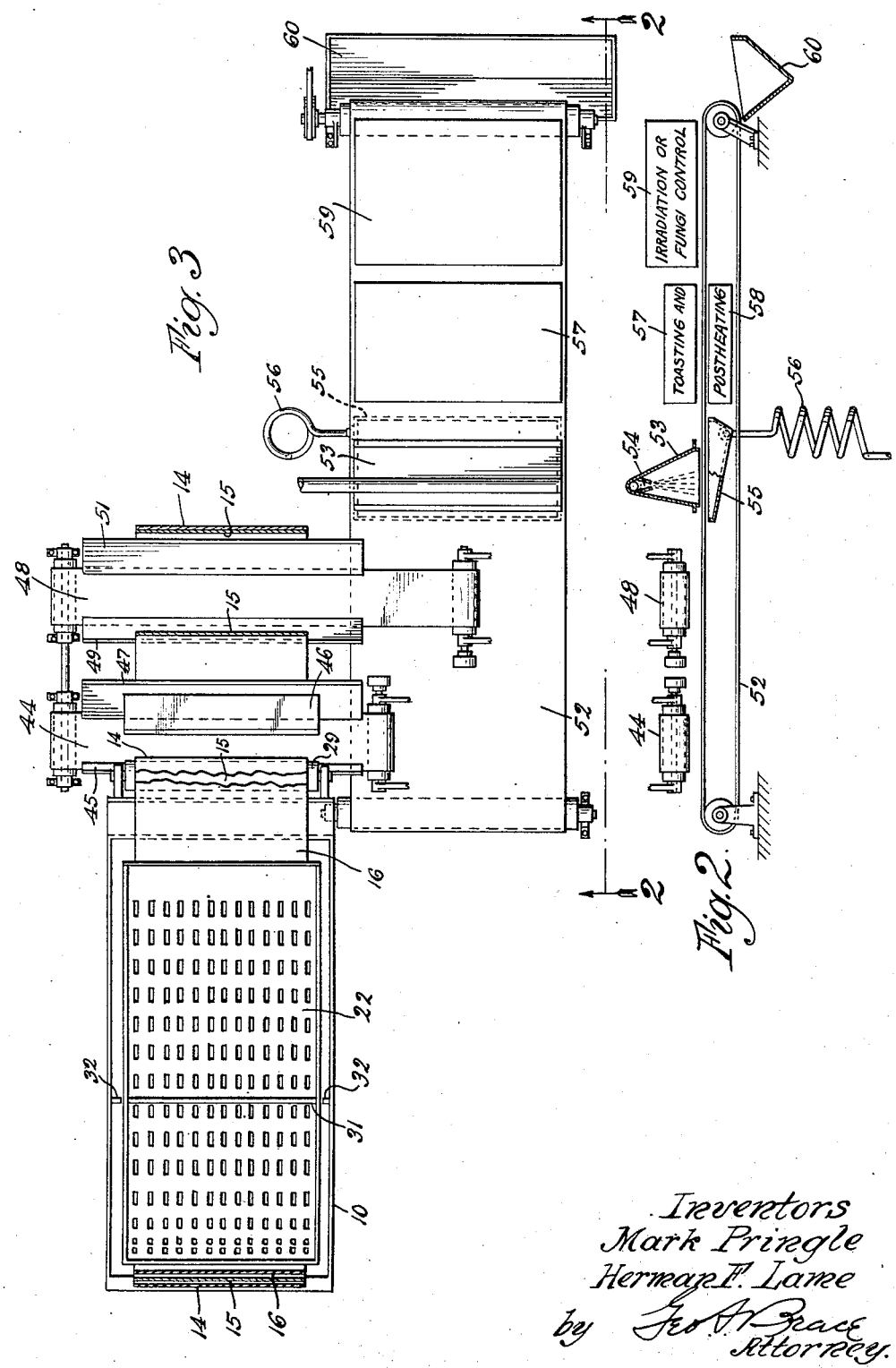
Inventors
Mark Pringle
Herman F. Lane
by Geo. A. Grace
Attorney.

Patented June 16, 1942

2,286,644

UNITED STATES PATENT OFFICE 2,286,644

METHOD AND APPARATUS FOR PROCESSING POTATOES

Mark Pringle, Amsterdam, and Herman F. Lame, Albany, N. Y., assignors of thirty-three and one-third per cent to George A. Brace Application March 5, 1937, Serial No. 129,158

20 Claims. (Cl. 99—100)

This invention relates to improvements in potato processing apparatus, food products having a primary potato base, and certain improved methods of manufacturing such products in a novel manner to be hereinafter more fully described.

A particularly desirable type of potato processing is one in which thin slices of the raw product are dehydrated and cooked in a hot liquid both to produce a crisp chip which has many desirable characteristics and uses as a food product. However, potato chips as heretofore made have possessed certain undesirable properties, and it is the object of this invention to overcome these difficulties and to provide a highly superior product.

For example, potato chip products now available are markedly non-uniform in size, shape, crispness and in other properties. Moreover, potato chips made according to known methods are exceedingly difficult to keep crisp and wholesome, for the period of time normally required for marketing. This is particularly true in warm weather. This is ascribable to various causes chief among which are the stated non-uniformity of the chips in size and shape rendering proper packaging impossible, and inferior methods of processing the raw potato.

One of the objects of this invention is to provide an apparatus whereby potatoes, as they come from the field, may be passed through a continuous process of novel character to produce a potato chip product having new and highly advantageous properties.

It is also an object of the invention to provide potato chips in wafer form the individual wafers being uniform in size, shape, color, and in all other characteristics.

Another object of the invention is to provide a wafer which is substantially flat, and which will retain such shape until consumed.

Another object of the invention is to make a food product in wafer form which can be readily marked with indicia of any desired character such as the identifying mark of the manufacturer.

Still another important object of the invention is to provide a food product in wafer form of such uniformity in size, weight and shape that it can be economically packaged in a very compact manner so as to exclude any appreciable quantity of air, moisture or other agencies tending to affect the crispness, wholesomeness, freshness, or other qualities possessed by the newly manufactured product.

A further object of the invention is to provide an apparatus for a method of processing potatoes so that the entire edible portion is utilized.

Other and further objects of the invention will become apparent from a consideration of the following detailed description thereof, and of one form of apparatus which may be employed to practice the invention as illustrated in the accompanying drawings in which:

Figure 2 is a side elevational view, partly in section, on line 2—2 of Figure 3 showing the apparatus for further treating the potatoes after the initial cooking process;

Figure 3 is a top plan view, partly in section, on line 3—3 of Figure 1; and,

Figure 1:
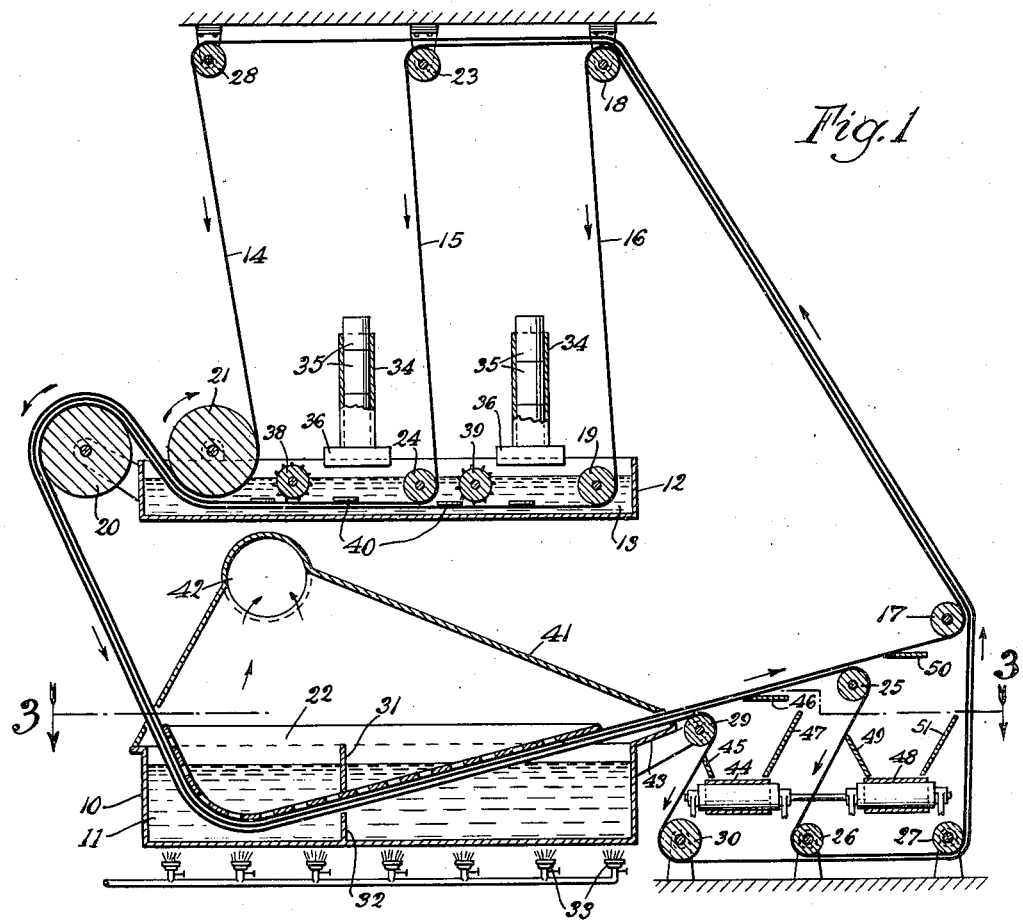
Figure 1 is a side elevational view, partly in section, of one form of apparatus for carrying out the objects of the invention.

A more complete understanding of the invention and the manner in which the same is practiced can be had from a detailed description of the drawings. In Figure 1, 10 represents a suitable container or cooking vat for the cooking fluid 11 such as an oil or fat, a vegetable oil like corn oil being preferable, while 12 indicates another container for a steeping fluid 13. Continuous conveyor belts 14, 15 and 16 are arranged on a series of roller supports, as clearly shown in Figure 1, which are so arranged and supported that the same pass first through the steeping fluid in container 12, and then through the cooking fluid in container 10.

One of the important features of the invention pertains to the novel arrangement of conveyor belts 14, 15 and 16, which may be of any suitable flexible material such as wire mesh, perforated sheet metal or fabric. At least two belts are essential, and as many more may be used as is found practicable. For purposes of illustration, three are shown in the present drawings. Belt 16 is the shortest of the three and is directly supported by rollers 17, 18, 19 and 20. Roller 19 is an idler roll which cooperates with roll 19 to keep a portion of belt 16 emersed in the steeping fluid 13, while the floating shoe 22 functions to keep another portion of the belt emersed in cooking fluid 11.

A second belt 15 passes over rollers 17, 18, 23, 24, 20, 25, 26 and 27, and a part thereof is in direct contact with belt 16. The third belt 14, in addition to being supported by rollers 17, 18, 20 and 27, is also supported in part by rollers 28, 29 and 30, and likewise lies in direct contact with belt 15 for part of its length.

The conveyor rollers may be supported in any convenient manner, but preferably certain rollers should be adjustably supported so that the tension on the individual belts as well as the belts as a whole may be varied at will. Shoe 22 in the cooking vat may be resiliently supported in a variety of ways so as to maintain a proper tension on the belts and to insure that the spacing between the belts as they pass through the cooking vat remains uniform. The bottom of shoe 22 is preferably perforated as best shown in Fig. 3 so that the cooking fluid can pass freely to both sides of the conveyor belts.

A vertical partition 31 may extend across shoe 22 opposite a corresponding partition 32 in the cooking vat. These partitions permit the maintenance of different temperatures on the opposite sides thereof, if this is found to be desirable. The cooking vat may be heated by a gas jet 33, or by any other heating means.

Between belts 14 and 15, and between belts 15 and 16, are shown potato feeding magazines 34 containing sections of raw potato 35 which may be of varying lengths, but each of which is of the same cross-sectional area. These sections may be fed to the magazines in any manner and pass downwardly through a slicing device 36.

As the sections of potato are sliced the slices 40 fall into the steeping fluid and onto one of the conveyor belts by means of which they are transported through the steeping fluid at a rate found by experience to be the most suitable for removing free starch from the potato slices. A sufficient number of potato magazines and slicing devices are employed to more or less completely cover the conveyor belts with a single layer of slices arranged in rows.

The steeping fluid may be water and should preferably be changed frequently to prevent the same from becoming saturated with free starch. The fluid also serves to carry away any foreign matter which may be present and to prevent discoloration of the potato slices before the cooking process.

As the slices pass through the steeping fluid, they may be marked with any desired indicia by marking devices 38 and 39. These devices may be of any suitable type such, for example, as the perforating type of marker in which portions of the slices are punched out, or in which a mark is formed by a series of pricks. Other types of marking devices will also suggest themselves and it is to be understood that any of the same are within the purview of this invention.

The slices of potato are carried from the steeping vessel directly into the cooking vat between the conveyor belts 14, 15 and 16 which are spaced apart only by the slices of potato. As the slices are conveyed through the hot cooking fluid, they are dehydrated and cooked to a crisp wafer. The slices are prevented from curling, warping or blistering by the conveyor belts throughout the cooking process as will be apparent from the foregoing and from Fig. 1 of the drawings.

The hot vapors given off by the cooking vat are collected under the canopy 41 and removed to any desired form of recovery apparatus (not shown) through conduit 42. It will also be noted that means 43 is provided at the discharge end of the cooking vat for collecting and returning much of the cooking fluid remaining on the conveyor belts to vessel 10.

The potato chips carried by lower belt 16 fall into the laterally extending endless conveyor 44, and any chips clinging to either belt 15 or 16 are removed by scrapers 45 and 46, respectively. Back-board 47 cooperates with scraper 45 in keeping the chips on conveyor 44. The chips carried between belts 14 and 15 likewise fall into a second transverse conveyor 48 similar to conveyor 44, and having scrapers 49 and 50, and a back-board 51 similar to and for the same purposes as the corresponding elements just described in connection with conveyor 44.

Turning now to Figs. 2 and 3, it will be seen that conveyors 44 and 48 discharge onto endless conveyor 52. Any suitable device may be used to evenly distribute the chips across conveyor 52 as they fall from the discharge ends of conveyors 44 and 48. Conveyor 52 travels in a clockwise direction as viewed in Fig. 2 and carries the chips or wafers which are still very warm beneath the seasoning hood 53, which contains a device 54 in the upper portion thereof for directing such seasoning material as liquid salt spray upon the chips as they pass beneath the hood. If a salt spray is employed, it may be carried by a liquid medium such as water or hot oil. Ordinarily it is unnecessary to spray the chips on both sides since the liquid salt quickly permeates the thin wafers. Any excess salt vapor collects in collecting trough 55 from whence it flows into condensing coils 56.

The wafers next pass between the toasting post-heater devices 57 and 58. These heaters contain grids which are maintained at a suitable temperature to complete the cooking or for imparting a more pleasing color to the wafers. Devices 57 and 58 also function to vaporize any excess liquid remaining on the wafers, and thus place them in condition for packaging. It will also be apparent that removal of this excess liquid will leave the wafers very crisp, which is one of the important factors in preventing deterioration thereof.

Additional precautions are also taken to avoid deterioration of the wafers before consumption. Thus, the wafers are next subjected to emanations from a device 59 producing ultra-violet light which not only destroys any bacteria or similar organisms present in the wafers but, as has recently been authoritatively demonstrated, is a very material aid in the formation of vitamins. The wafers are finally discharged from conveyor 52 into a hopper 60 leading to a wrapping and packing apparatus not shown.

It will, therefore, be apparent that we have not only devised an entirely new method and apparatus for producing a food product such as potato chips, but we have also conceived of new and novel modes of treating the cooked product whereby its food value is not only increased, but is preserved to an extent not heretofore known.

As a still further aid in the preservation of the wafers, attention is directed to the final step of the process, namely; that of packaging. Although no device is shown in the drawings for performing this important task, it will be understood that any desired apparatus readily obtainable on the market may be used, the particular apparatus selected being immaterial, so long as it is one by means of which the wafers can be stacked closely together and tightly wrapped in a wrapper impervious to moisture and air, and in such manner that very little air remains in the package. The wrapper may be of such material as to exclude light, though this is not of importance.

It is thought that the manner in which the apparatus herein shown operates has been so fully described in the foregoing that it is unnecessary to say anything further at this point. It will, of course, be understood that the apparatus which has just been described is merely illustrative of a preferred arrangement of the more essential elements for practicing the invention, and that many variations and modifications thereof may be resorted to by those skilled in the art without departing from the scope of this invention. Although no source of power, as well as other necessary parts of the apparatus have been described, it will be understood that the various conveyors and other moving parts may be driven in any suitable manner, and that the other parts necessary in an operable device can be supplied by any skilled mechanic.

Figure 4:
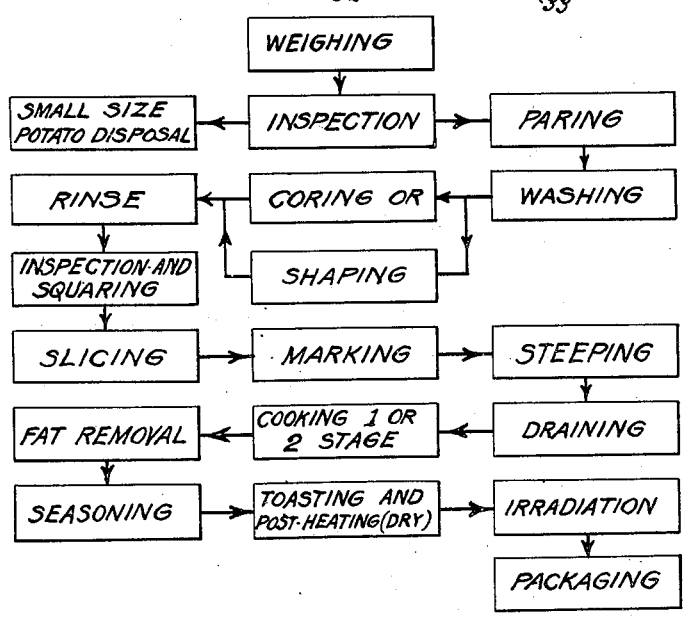
Figure 4 is a diagrammatic representation of the various steps taken in processing the potatoes given in the preferred order of performing the same.

One of the preferred modes of carrying out the process in accordance with this invention is as follows:

The various steps of the process arranged in a preferred manner are diagrammatically illustrated in Fig. 4. From this chart it will be seen that the potatoes are initially weighed and inspected, at which time inferior potatoes, as well as foreign bodies, are removed. If desired, the potatoes may then be graded into various sizes, or if the potatoes are fairly uniform, it will only be necessary for the inspectors to cast aside the small specimens.

The inspected potatoes are next pared, preferably by machinery, of which there are many forms available on the market. After a thorough washing the pared potatoes pass into a shaping machine which forms the potatoes into uniformly shaped sections of the same cross-sectional area, though, of course, the sections may be of different lengths, depending upon the size of the individual potatoes. This step is sometimes known as coring. At this point, the potato sections are separated from the shavings and slabs removed in the shaping or coring operation, and are passed through another rinsing stage. The shavings and slabs just referred to can be shaped into strings and a variety of novelty forms in preparation for the cooking and treating process which is of the same character as that to be described hereinafter in connection with the potato sections. It will, therefore, be seen that our invention contemplates and provides for the use of the entire edible portion of the potato.

The sections are now inspected and the opposite ends of each section are squared. The sections are now ready to be sliced and cooked, and are conveyed into the slicing machine magazines 34. As the sections are sliced the slices fall into the steeping fluid and onto the conveyor belts. If desired, each slice can be marked at this point with any desired form of indicia as hereinabove described.

After the slices have been steeped sufficiently long to remove any free starch, they are removed from the steeping bath, drained, and immediately passed into the hot cooking fluid. It has been found that a superior product results if the temperature of the cooking bath varies in different stages of the cooking operation, and that a very good product can be obtained by conveying the slices, first, through hot cooking fluid at a low temperature, and then through at least one stage at a higher temperature. Any desired number of cooking stages operating at different temperatures can be used by simply inserting the necessary partitions across the cooking vat. It is not important that these partitions be fluid tight, since different temperatures can be easily maintained by any means which retards thermosyphonic circulation of the fluid.

It must be remembered, of course, that from the time the potatoes are sliced until they are finally cooked into a crisp wafer, it is important that the slices be restrained against curling, warping, blistering or losing the shape given to them by the slicing apparatus, it being understood that by slicing is meant the operation by which the potato sections are formed into thin subdivisions of similar size and shape.

As the wafers emerge from the cooking vat, the cooking fluid is allowed to drain off and return to the vat. Any desired seasoning, such as salt, may now be applied to the wafers, it having been found that liquid salt in a water or an oil solution imparts a very fine flavor to the wafers.

From the seasoning operation the wafers pass between the toasting and post-heating grids which serve several purposes. Among other things, these grids can be controlled to give a rich brown color to the wafers, to vaporize any remaining liquid or fat, to facilitate the thorough penetration of the seasoning material, and to give additional crispness to the wafers. It will also be evident that the wafers will emerge from the toasting and post-heating operation thoroughly cooked and dehydrated.

The final treatment stage is one in which the wafers are subjected to irradiations from a specially designed ultra-violet light apparatus now available on the market, and which, in itself, forms no part of this invention. These emanations not only serve to kill any bacteria or other similar bodies in the wafers, but also to so act upon the constituents that certain vitamins are developed in a manner not as yet fully understood.

The wafers are now ready for packaging and to this end may be passed through an assorting device to arrange the wafers in compact form and in such manner that as much air as possible can be excluded from the package. The wrapping may be any suitable material, such as airtight transparent or opaque sheets. In this way, the wafers can be kept for long periods in their original crisp and wholesome condition.

Too much importance cannot be attached to the final treating stages of our invention, since it is at this point that a part of the superior flavor, the appealing color, the additional food value, and the excellent preservative qualities are imparted to the wafers.

It will be understood that the foregoing description of the method of practicing our invention can be carried out in various other ways, and by apparatus other than that shown and described without departing from the spirit of the invention or the scope of the annexed claims.

We claim:

1. The process of making an edible food product comprising passing slices of raw potatoes through a cooking bath while restraining the lateral side portions thereof against displacement whereby the resultant product is a substantially flat wafer.

2. The method of making potato chips comprising passing slices of the raw product through a cooking bath and preventing at least one side of the slices from becoming displaced from the plane of the slice.

3. The process of making potato chips which comprises dehydrating and cooking slices of raw potato while maintaining the slices substantially flat.

4. The method of processing potatoes comprising preparing uniformly shaped sections of raw potato, slicing said sections into thin wafers, pricking openings into each wafer, removing free starch from the wafers, and passing the wafers through a hot cooking fluid without allowing the same to become distorted.

5. The method of processing potatoes comprising forming uniformly shaped sections of potato from cleaned specimens of the raw product, slicing the sections into thin wafers, shaping the residue from the formation of the sections into small portions, removing the free starch from all the pieces, passing the wafers through a cooking fluid without allowing the same to become distorted, seasoning the wafers, and tightly packaging and sealing the wafers.

6. The method of processing slices of raw potato so that the same may be tightly wrapped and sealed in a moisture resisting package containing a minimum of air, comprising passing slices of raw potato of uniform size and shape through a hot body of cooking fluid while retaining the slices flat, removing excess cooking fluid, applying a seasoning material to the slices, subjecting the slices to heat to obtain a desired color, to vaporize retained liquids, and to insure a more uniform permeation of the seasoning, and exposing the slices to ultra-violet irradiation for the purposes described.

7. The process of making an edible food product comprising forming similar shaped, thin-walled pieces of raw potato and passing said pieces through a cooking process while restraining the lateral side portions thereof against displacement.

8. The method of processing raw potatoes which includes slicing sections of raw potato of uniform cross-section, marking at least certain of the slices with indicia, and cooking the slices so as to form a crisp, dehydrated, substantially undistorted wafer in which said indicia is clearly legible.

9. Apparatus for processing raw potatoes in a continuous operation which includes means for slicing prepared sections of the raw product, conveyor means, including means for pricking indicia into the slices, means for conveying the slices through a steeping fluid and then through a cooking fluid, while retaining the slices in their original shape, treating means for seasoning the cooked slices and for driving off excess liquid remaining thereon, and means for subjecting the slices to ultra-violet irradiations.

10. The method of treating raw potatoes which comprises forming the major portion of a potato into one or more sections of uniform cross-section, reducing the minor portion to pieces having at least one dimension relatively small in comparison to other dimensions, reducing said sections to similar shaped, thin-walled pieces, and passing the pieces of both portions through a cooking bath while restraining at least those pieces from said major portion against distortion.

11. An apparatus for making potato chips comprising a container for hot cooking fluid, conveyor means arranged to conduct raw slices of potato into cooking relation to said hot fluid whereby said slices are processed by said hot fluid, said means being constructed and arranged to prevent said slices from becoming distorted while being processed and while cooling after the cooking process.

12. That method of heat treating a food product of the type tending to become warped and deformed during treatment, which comprises preforming the raw product into a thin-walled wafer-like blank, passing said preformed blank through a heated cooking zone, and then through an unheated zone, and preventing said blanks from becoming distorted in any substantial amount while being heat treated and cooled.

13. A food product comprising a thin-walled, dehydrated, cooked piece of potato, the walls of which have substantially the same shape and contour as before being dehydrated and cooked.

14. In combination, a cooking vat for holding a cooking fluid, means dividing said vat into a plurality of independent cooking chambers, means for heating the cooking fluid in said chambers to different temperatures, a conveyor including a plurality of flexible belts, means supporting said conveyor for movement through said chambers of said vat, means holding said belts in closely spaced relation as the same pass through said chambers, and means for feeding thin-walled pieces of an uncooked edible between said belts for transport through the heated cooking fluid in said vat whereby said pieces are held against distortion as the same are cooked.

15. The combination set forth in claim 14, characterized by the provision of means for draining cooking fluid from the cooked pieces as the conveyor emerges from the cooking fluid and of means for thereafter treating the pieces and the adhering cooking fluid with ultra-violet rays to retard the growth of bacteria and fungi bodies.

16. Apparatus for dehydrating raw potatoes comprising a vessel adapted to hold a cooking fluid, means to heat said fluid, means for holding a plurality of thin walled pieces of raw potato against distortion, means for submerging said last named means in said cooking fluid while the pieces of potato are being dehydrated, means for removing said holding means from the cooking fluid while holding said pieces of potato against distortion, means for draining excess cooking fluid from the dehydrated pieces of potato as the same are leaving said cooking vessel, and means for thereafter treating the dehydrated pieces and the adhering cooking fluid with ultra-violet rays to retard the growth of bacteria and similar foreign bodies.

17. An apparatus for making potato chips comprising a container for hot cooking fluid, endless conveyor means having opposed substantially flat surfaces arranged to conduct raw slices of potato into cooking relation to said hot fluid whereby said slices are processed by this hot fluid, said means being constructed and arranged to prevent said slices from becoming distorted while being processed and while cooling after the cooking process.

18. An apparatus for making potato chips comprising a container for hot cooking fluid, reticulated conveyor means including a plurality of endless webs having portions thereof passing in closely spaced relation and arranged to conduct raw slices of potato into cooking relation to said hot cooking fluid whereby said slices are processed by said hot fluid, said means being constructed and arranged to prevent said slices from becoming distorted while being processed and while cooling after the cooking process.

19. An apparatus for making potato chips comprising a container for hot cooking fluid, conveyor means including a plurality of endless webs arranged to provide substantially continuous support to the opposite side of slices of potato and to conduct raw slices of potato into cooking relation to said hot fluid whereby said slices are processed by said hot fluid, said means being constructed and arranged to prevent said slices from becoming distorted while being processed and while cooling after the cooking process, and means for thereafter subjecting said slices to a preservative process.

20. An apparatus for making potato chips comprising a container for hot cooking fluid, means separating said container and the fluid therein into a plurality of bodies, means for heating said bodies of fluid to different temperatures, conveyor means arranged to conduct raw slices of potato into cooking relation to said hot bodies of fluid whereby said slices are processed by said hot fluid, said means being constructed and arranged to prevent said slices from becoming distorted while being processed and while cooling after the cooking process.

HERMAN F. LAME.
MARK PRINGLE.